Aug. 29, 1961  S. R. BITHELL, JR  2,997,877
STUFFING BOX
Filed Oct. 17, 1957

INVENTOR
SIDNEY R. BITHELL, JR
BY Strauch, Nolan & Neale
ATTORNEYS

United States Patent Office 2,997,877
Patented Aug. 29, 1961

2,997,877
STUFFING BOX
Sidney R. Bithell, Jr., Du Bois, Pa., assignor to Rockwell Manufacturing Company, Pittsburgh, Pa., a corporation of Pennsylvania
Filed Oct. 17, 1957, Ser. No. 690,735
3 Claims. (Cl. 73—272)

This invention relates to stuffing box construction and particularly to such providing a spring biased gas tight seal for a rotatable shaft emerging through the wall of a gas meter or the like.

In its preferred embodiment about to be specifically described the invention seals a rotatable shaft of a gas meter indicator drive, a resilient annulus being sufficiently compressed to dynamically seal around the shaft and at the same time provide an associated static seal. The invention provides a dual gas tight seal in the illustrated embodiment and is superior to known gas meter stuffing boxes.

The major object of the invention is to provide a novel spring biased gas tight stuffing box for a rotatable shaft.

It is a further object of the invention to provide a novel shaft seal wherein a resilient annulus surrounding the shaft is axially compressed to provide a tight radial seal and at the same time expanded to snugly surround the shaft and provide a gas tight axial seal.

It is a further object of the invention to provide a novel dual seal for a rotatable gas meter or like shaft.

A further object of the invention is to provide a novel stuffing box providing a gas tight seal for a rotatable shaft, wherein a compression spring exerts uniform force on axially spaced resilient seal members surrounding the shaft, and means is provided for adjusting the compression of the spring.

It is a further object of the invention to provide a novel gas tight stuffing box for a rotatable shaft wherein a resilient annular seal is maintained by a compression spring, and the compression of the spring is attained and adjusted by an axially movable gland.

Figure 1:
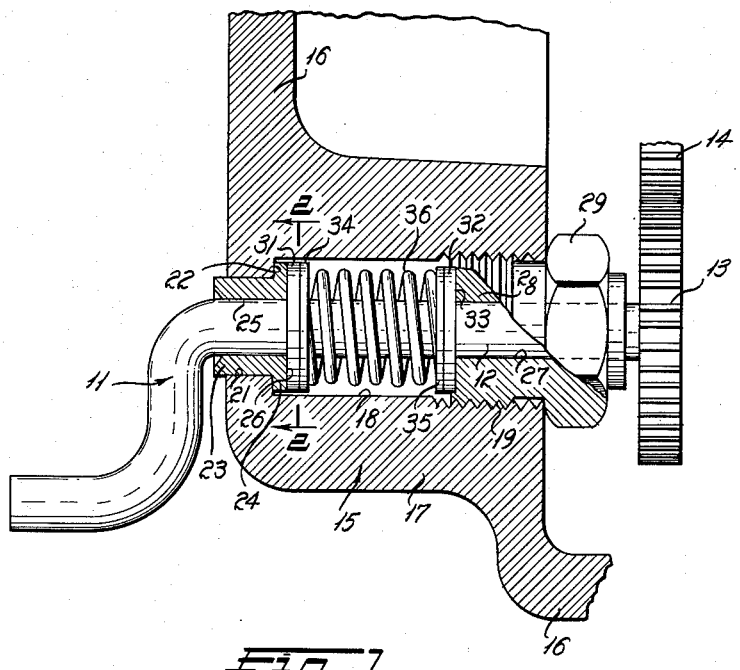
Figure 2:
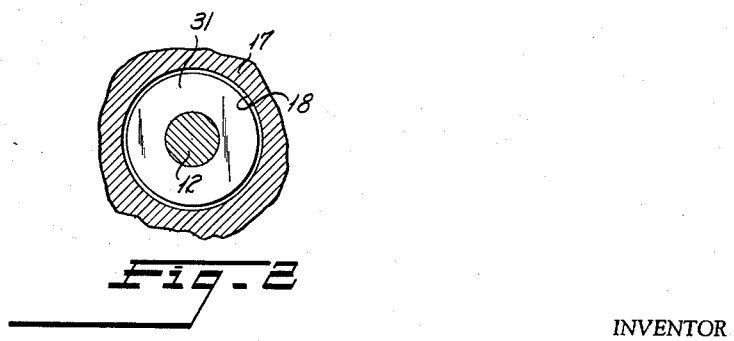

Further objects of the invention will appear as the description proceeds in connection with the appended claims and the annexed drawings wherein:

FIGURE 1 is a fragmentary section showing a preferred embodiment of the invention; and FIGURE 2 is a section on line 2—2 of FIGURE 1.

A rotatable shaft 11, driven primarily by suitable means such as the bellows mechanism of a conventional gas meter, has a straight cylindrical section 12 mounted in the special gas tight seal shown in the drawing and carries at its outer end a transfer gear 13 adapted to mesh with and drive gearing indicated at 14 leading to a register device.

The meter or other casing cover side wall 15 has a normally thin wall thickness as indicated at 16 but is formed with a thickened boss section 17 in which the seal is mounted. A cylindrical bore 18 is formed in boss 17 and has a short threaded section 19 at its outer end. The inner end of the bore is reduced to provide a smaller coaxial cylindrical bore section 21 and an outwardly facing flat continuous radial shoulder at 22.

A bearing sleeve 23 has a tight force fit within bore section 21 and its outer end is flanged radially at 24 to seat on shoulder 22. Sleeve 23 has an inner bore 25 that surrounds shaft section 12 with a smooth rotatable fit, and flange 24 presents to the interior of bore 18 a flat smooth annular surface 26 at right angles to the shaft axis.

Sleeve 23 is preferably an integral member of powdered metal compressed with a lubricant component such as graphite to provide a good glass-smooth bearing support for shaft section 12, and sleeve 23 is non-rotatable with respect to cover boss 17.

Shaft section 12 extends freely through bore 18 and is rotatably received at its outer end in the smooth bore 27 of a stuffing box gland 28 threaded into the bore at 19 and having an enlarged nut-like head 29 outside the bore for a tool to engage and turn.

Seated on the flat smooth annular face 26 of bushing 23 is a flat annulus 31 of resilient material such as synthetic rubber. A similar flat resilient annulus 32 is seated partially in an annular flat smooth recess surface 33 formed at right angles to the shaft axis in the inner end of gland 28 around bore 27. Rigid flat annular metal washers 34 and 35 are mounted in full surface engagement with resilient annuli 31 and 32 respectively, and a relatively powerful coiled compression spring 36 surrounds shaft section 12 in spaced relation and bears slidably at opposite ends on the washers 34 and 35 so as to tightly urge them apart and thereby compress both resilient members 31 and 32 axially.

As shown in FIGURE 2 the bore of resilient member 31 preferably has only assembly clearance with the periphery of shaft section 12 for sliding it lengthwise along shaft section 12 to final position, and similarly member 32 which is mounted on gland 28 has a similar close fit in the initial assembly stages. The washers 34 and 35 have slightly greater radial clearance but are of such size as to have substantially full surface bearing on the resilient annuli. As gland 28 is tightened during assembly, spring 36 is compressed and substantially equal axial compressive forces distributed over the wide contact areas of the washers and resilient members are exerted on the resilient annular members 31 and 32 which are thereby flattened to expand radially both inwardly and outwardly. The amount of compression can be determined, maintained and adjusted by turning gland 28.

Inward expansion of each resilient annulus 31 and 32 causes each to snugly resiliently sealingly engage the smooth surface of shaft section 12 over an appreciably long axial area, so as to prevent gas leakage along the shaft section, and the increased tight seating of member 31 against surface 26 and member 32 against recess 33 provides a good gas tight radial seal. Thus a very effective dual seal is provided, and any gas that passes the inner seal at 31 will be baffled by the outer seal at 32.

It will be observed that all of the stuffing box components including the bushing 23 are introduced through the outer open end of the bore and held in assembly by gland 28.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas meter, a casing wall having an integral thickened portion serving as a stuffing box housing and formed with a through bore that opens outwardly of said casing, a rotatable driven meter shaft extending through said bore, said bore being of appreciably larger diameter than said shaft, a bushing supporting said shaft in said bore adjacent the inner end of said bore, an axially shiftable hollow gland removably mounted in the other end of the bore and through which said shaft extends, a register drive connection on said shaft outside said wall, resilient annular sealing means surrounding said shaft within the bore at the inner ends of said bushing and gland respectively, and a compression spring within the bore surrounding said shaft compressed between said sealing means, said bushing, sealing means, spring and gland being inserted through the outer end of said bore during assembly.

2. In a gas meter, a meter casing wall having an integral thickened portion that serves as a stuffing box housing and is formed with a through bore that opens outwardly of said casing wall, a rotatable driven meter shaft extending axially through said bore, said bore being of appreciably larger diameter than said shaft, a shaft supporting bushing mounted on said wall within the inner end of the bore and formed with a flange axially seated on an internal shoulder of said bore and a flat smooth annular surface disposed at right angles to the shaft and closely surrounding the latter, an annulus of resilient material surrounding said shaft in substantially full surface engagement with said bushing surface, a flat rigid annulus surrounding said shaft in substantially full surface engagement with said resilient annulus, a coil spring within said bore engaging said rigid annulus at one end, a removable gland assembly having a through bore rotatably mounting said shaft threaded in said casing wall within the outer end of said bore and engaging the other end of said spring whereby rotation of said gland in one direction maintains said bushing tight on said shoulder and expands said resilient annulus to have a gas tight running fit with said shaft, and rotation of the gland in the other direction enables removal of said gland, spring, rigid annulus, resilient annulus and bushing from said casing through the outer end of said bore, said bushing, gland, spring, rigid annulus and resilient annulus all being inserted through the outer end of said bore during assembly, and a register drive connection on said shaft outside said casing.

3. In a stuffing box construction for a gas meter or the like, a meter wall having an integral relatively thick boss formed with a through bore, a rotatable shaft extending through said bore, said bore being of appreciably larger diameter than said shaft, a removable gland within which said shaft is journalled threadedly rotatable on said meter wall within said bore, a register drive connection on said shaft outside said wall, a removable bushing in the inner end of said bore rotatably supporting said shaft, a resilient annulus mounted on the inner end of said gland closely surrounding said shaft, and means within the bore comprising a coil spring reacting against said bushing and compressed by rotation of the gland in one direction for axially compressing said resilient annulus to radially expand it into a gas tight running fit with said shaft, said bushing, resilient annulus, coil spring and gland all being inserted into the open outer end of said bore during assembly.

References Cited in the file of this patent
UNITED STATES PATENTS

| | | |
|---|---|---|
| 1,448,021 | Wishart et al. | Mar. 13, 1923 |
| 1,584,127 | Norton | May 11, 1926 |
| 2,065,007 | MacLean | Dec. 22, 1936 |
| 2,118,855 | Miller | May 31, 1938 |
| 2,236,370 | Jackman | Mar. 25, 1941 |
| 2,562,595 | Blue | July 31, 1951 |

FOREIGN PATENTS

| | | |
|---|---|---|
| 10,164/32 | Australia | Nov. 15, 1932 |